US012321362B1

(12) United States Patent
Roche et al.

(10) Patent No.: US 12,321,362 B1
(45) Date of Patent: Jun. 3, 2025

(54) CONVERTING HIERARCHICAL DATA INTO RELATIONAL DATA

(71) Applicant: Massachusetts Mutual Life Insurance Company, Springfield, MA (US)

(72) Inventors: Michael Roche, Springfield, MA (US); Andrew Sheridan, Springfield, MA (US); Ellie Nerney, Springfield, MA (US); Daniel Oldham, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 130 days.

(21) Appl. No.: 17/960,671

(22) Filed: Oct. 5, 2022

(51) Int. Cl.
*G06F 16/00* (2019.01)
*G06F 16/22* (2019.01)
*G06F 16/25* (2019.01)
*G06F 16/84* (2019.01)

(52) U.S. Cl.
CPC ........ *G06F 16/258* (2019.01); *G06F 16/2282* (2019.01); *G06F 16/86* (2019.01)

(58) Field of Classification Search
CPC ..... G06F 16/258; G06F 16/86; G06F 16/2282
USPC ......................................................... 707/758
See application file for complete search history.

(56) References Cited

U.S. PATENT DOCUMENTS

| 11,119,990 | B1* | 9/2021 | Chhawacharia | ...... G06F 16/211 |
| 2005/0228787 | A1* | 10/2005 | Van der Linden | ...... G06F 16/86 |
| 2009/0077625 | A1* | 3/2009 | Van Der Linden | ..... G06F 16/86 |
| | | | | 707/999.102 |
| 2019/0065553 | A1* | 2/2019 | Young | ................... G06F 16/258 |
| 2021/0133477 | A1* | 5/2021 | Dhanuka | ............. G06F 16/9014 |

OTHER PUBLICATIONS

Navid Yaghmazadeh et al., "Automated Migration of Hierarchical Data to Relational Tables using Programming-by-Example", Proceedings of the VLDB Endowment, vol. 11, No. 5; Aug. 2018, Rio de Janeiro, Brazil; pp. 580-593.*

* cited by examiner

*Primary Examiner* — Monica M Pyo
(74) *Attorney, Agent, or Firm* — Foley & Lardner LLP

(57) ABSTRACT

Embodiments described herein are related to systems and methods for converting hierarchical data into relational data. In one aspect, a system obtains a data object of the set of data objects in the hierarchical data. For the data object, the system can determine an anchor path and an object path. An anchor path may indicate or may be associated with a corresponding table to generate. An object path may indicate or may be associated with a corresponding column of the table. The system can determine, from a set of candidate anchor paths, an anchor path for the data object. The system can determine, from a set of candidate object paths, an object path for the data object. The system can generate a row of the table associated with the anchor path, where the row may include a value of the data object at a column associated with the object path.

18 Claims, 8 Drawing Sheets

```
610 → <Shredder>
        <Table name="COLLECTION" anchor="">
          <Column name="NAME" path="name"/>        ← 612
          <Column name="ID" path="id"/>            ← 614
620 →   </Table>
        <Table name="ALBUM" anchor="album">
          <Column name="TITLE" path="album.title"/>    ← 622
          <Column name="ARTIST" path="album.artist"/>  ← 624
          <Column name="GENRE" path="album.genre"/>    ← 626
          <Column name="ID" path="album.id"/>          ← 628
630 →   </Table>
        <Table name="TRACK" anchor="album.track">
          <Column name="NAME" path="album.track.name"/>        ← 632
          <Column name="POSITION" path="album.track.position"/> ← 634
          <Column name="ID" path="album.id"/>  ← 636
        </Table>
      </Shredder>
```

*FIG. 6*

```
Input File                                            ┌─ 700
710 ─→  {
            "name": "mike's collection",  ←─ 712
            "id": "1",                    ←─ 714

"album": [
720 ─→      {
                "title": "MyTitle1",      ←─ 722
                "artist": "Artist1",      ←─ 724
                "genre": "Genre1",        ←─ 726
                "id": "10001",            ←─ 728
730 ─→          "track": [
                {
                    "position": "1",              ←─ 732
                    "name": "Album1track1"        ←─ 734
740 ─→          },
                {
                    "position": "2",              ←─ 742
                    "name": "Album1track2"        ←─ 744
750 ─→          },
                {
                    "position": "3",              ←─ 752
                    "name": "Album1track3"        ←─ 754
                }
                ]
770 ─→      },
            {
                "title": "MyTitle2",      ←─ 772
                "artist": "Artist2",      ←─ 774
                "genre": "Genre2",        ←─ 776
                "id": "10002",            ←─ 778
780 ─→          "track": [
                {
                    "position": "1",              ←─ 782
                    "name": "Album2track1"        ←─ 784
                }
                ]
            }
            ]
        }
```

*FIG. 7*

```
TABLE: COLLECTION
+-----------------+---+
|             NAME| ID|
+-----------------+---+
|mike's collection|  1|    ← 812
+-----------------+---+
```
810 →

```
TABLE: ALBUM
+--------+-------+------+-----+
|   TITLE| ARTIST| GENRE|   ID|
+--------+-------+------+-----+
|MyTitle1|Artist1|Genre1|10001|   ← 822
|MyTitle2|Artist2|Genre2|10002|   ← 824
+--------+-------+------+-----+
```
820 →

```
TABLE: TRACK
+-----------+--------+--------+
|       NAME|POSITION|ALBUM-ID|
+-----------+--------+--------+
|Album1track1|      1|   10001|   ← 832
|Album1track2|      2|   10001|   ← 834
|Album1track3|      3|   10001|   ← 836
|Album2track1|      1|   10002|   ← 838
+-----------+--------+--------+
```
830 →

FIG. 8

CONVERTING HIERARCHICAL DATA INTO RELATIONAL DATA

TECHNICAL FIELD

This application relates generally to automatically converting hierarchical data into relational data.

BACKGROUND

Hierarchical data can include a set of data objects having a hierarchical relationship. For example, JavaScript object notation (JSON) data or extensible markup language (XML) data can have a data structure including one or more data objects. A data object can be a key-value pair of information to store (e.g., characters, numerical values, arrays of values, etc.) or can be a nested data structure. A nested data structure may be a data structure within its parent data structure. Such nested data structure may form a hierarchical relationship to allow flexibility in storing data with various forms. However, hierarchical data may be inefficient for searching or querying and may be inadequate for a big data analysis.

SUMMARY

Disclosed herein are embodiments related to a method of converting hierarchical data into relational data. In some embodiments, the method includes receiving, by one or more processors, hierarchical data including a set of data objects having a hierarchical relationship. In one embodiment, the method may include obtaining, by the one or more processors, a data object of the set of data objects in the hierarchical data. In some embodiments, the method includes determining, by the one or more processors, from a set of candidate anchor paths, an anchor path for the data object. Each of the sets of candidate anchor paths may be associated with a corresponding table to generate. In some embodiments, the method includes determining, by the one or more processors, from a set of candidate object paths, an object path for the data object. Each of the set of candidate object paths may be associated with a column of a corresponding table to generate. In some embodiments, the method includes generating, by the one or more processors, a row of a table associated with the anchor path. The row may include a value of the data object at a column associated with the object path.

The method may include adding, by the one or more processors, an entry including a key of the data object to a stack. In one aspect, the method further includes concatenating keys in entries of the stack including the entry to obtain the first concatenated keys. In one aspect, the method further includes determining, by the one or more processors, the object path from the set of candidate object paths matching the first concatenated keys.

The method may include concatenating existing keys in entries of the stack other than the entry to obtain second concatenated keys. In one aspect, the method includes determining, by the one or more processors, the anchor path from the set of candidate anchor paths matching the second concatenated keys.

The method may include storing, by a cache memory, the value of the data object and an indication of the column, in response to determining the object path from the set of candidate object paths matching the first concatenated keys. In one aspect, the method includes removing, by the one or more processors, the entry including the key of the data object from the stack, in response to storing the value of the data object and the indication of the column by the cache memory.

The method may include determining, by the one or more processors, whether values of a set of columns of the row are stored by the cache memory. The row of the table associated with the anchor path may be generated, in response to determining that the values of the set of columns of the row are stored by the cache memory.

The method may include obtaining, by the one or more processors, another data object in the hierarchical data. In one aspect, the method includes determining, by the one or more processors, from the set of candidate object paths, another object path for the another data object. In one aspect, the method includes generating, by the one or more processors, the row of the table including another value of the another data object at another column associated with the another object path.

The method may include receiving, by the one or more processors, a user input specifying the set of candidate anchor paths and the set of candidate object paths. In one aspect, the method includes generating, by the one or more processors, configuration data indicating the set of candidate anchor paths and the set of candidate object paths, according to the user input.

The method may include analyzing, by the one or more processors, sample data. In one aspect, the method includes determining, by the one or more processors, the set of candidate anchor paths and the set of candidate object paths, based on the sample data. In one aspect, the method includes generating, by the one or more processors, configuration data indicating the determined set of candidate anchor paths and the determined set of candidate object paths.

The hierarchical data may be JSON data or XML data.

The method may include determining, by the one or more processors, a type of one or more data objects in the hierarchical data. In one aspect, the method includes processing, by the one or more processors, the one or more data objects, according to the determined type.

Disclosed herein are embodiments related to a system for converting hierarchical data into relational data. In some embodiments, the system includes one or more processors and a non-transitory computer readable medium storing instructions executable by the one or more processors. In some embodiments, the non-transitory computer readable medium stores instructions when executed by the one or more processors cause the one or more processors to receive hierarchical data including a set of data objects having hierarchical relationship. In some embodiments, the non-transitory computer readable medium stores instructions when executed by the one or more processors cause the one or more processors to obtain a data object of the set of data objects in the hierarchical data. In some embodiments, the non-transitory computer readable medium stores instructions when executed by the one or more processors cause the one or more processors to determine, from a set of candidate anchor paths, an anchor path for the data object. Each of the set of candidate anchor paths may be associated with a corresponding table to generate. In some embodiments, the non-transitory computer readable medium stores instructions when executed by the one or more processors cause the one or more processors to determine, from a set of candidate object paths, an object path for the data object. Each of the set of candidate object paths may be associated with a column of a corresponding table to generate. In some embodiments, the non-transitory computer readable medium stores instructions when executed by the one or more processors cause the one or more processors to generate, a row of a table associated with the anchor path. The row may include a value of the data object at a column associated with the object path.

The non-transitory computer readable medium may store instructions when executed by the one or more processors cause the one or more processors to add an entry including a key of the data object to a stack. In some embodiments, the non-transitory computer readable medium stores instructions when executed by the one or more processors cause the one or more processors to concatenate keys in entries of the stack including the entry to obtain first concatenated keys. In some embodiments, the non-transitory computer readable medium stores instructions when executed by the one or more processors cause the one or more processors to determine the object path from the set of candidate object paths matching the first concatenated keys.

The non-transitory computer readable medium may store instructions when executed by the one or more processors cause the one or more processors to concatenate existing keys in entries of the stack other than the entry to obtain second concatenated keys. In some embodiments, the non-transitory computer readable medium stores instructions when executed by the one or more processors cause the one or more processors to determine the anchor path from the set of candidate anchor paths matching the second concatenated keys.

The non-transitory computer readable medium may store instructions when executed by the one or more processors cause the one or more processors to store, by a cache memory, the value of the data object and an indication of the column, in response to determining the object path from the set of candidate object paths matching the first concatenated keys. In some embodiments, the non-transitory computer readable medium stores instructions when executed by the one or more processors cause the one or more processors to remove the entry including the key of the data object from the stack, in response to storing the value of the data object and the indication of the column by the cache memory.

The non-transitory computer readable medium may store instructions when executed by the one or more processors cause the one or more processors to determine whether values of a set of columns of the row are stored by the cache memory. In some embodiments, the row of the table associated with the anchor path is generated, in response to determining that the values of the set of columns of the row are stored by the cache memory.

The non-transitory computer readable medium may store instructions when executed by the one or more processors cause the one or more processors to obtain another data object in the hierarchical data. In some embodiments, the non-transitory computer readable medium stores instructions when executed by the one or more processors cause the one or more processors to determine, from the set of candidate object paths, another object path for the another data object. In some embodiments, the non-transitory computer readable medium stores instructions when executed by the one or more processors cause the one or more processors to generate the row of the table including another value of the another data object at another column associated with the another object path.

The non-transitory computer readable medium may store instructions when executed by the one or more processors cause the one or more processors to receive a user input specifying the set of candidate anchor paths and the set of candidate object paths. In some embodiments, the non-transitory computer readable medium stores instructions when executed by the one or more processors cause the one or more processors to generate configuration data indicating the set of candidate anchor paths and the set of candidate object paths, according to the user input.

The non-transitory computer readable medium may store instructions when executed by the one or more processors cause the one or more processors to analyze sample data. In some embodiments, the non-transitory computer readable medium stores instructions when executed by the one or more processors cause the one or more processors to determine the set of candidate anchor paths and the set of candidate object paths, based on the sample data. In some embodiments, the non-transitory computer readable medium stores instructions when executed by the one or more processors cause the one or more processors to generate configuration data indicating the determined set of candidate anchor paths and the determined set of candidate object paths.

Disclosed herein are embodiments related to a non-transitory computer readable medium storing instructions for converting hierarchical data into relational data. In some embodiments, the non-transitory computer readable medium stores instructions when executed by one or more processors cause the one or more processors to receive hierarchical data including a set of data objects having hierarchical relationship. In some embodiments, the non-transitory computer readable medium stores instructions when executed by the one or more processors cause the one or more processors to obtain a data object of the set of data objects in the hierarchical data. In some embodiments, the non-transitory computer readable medium stores instructions when executed by the one or more processors cause the one or more processors to determine, from a set of candidate anchor paths, an anchor path for the data object. Each of the set of candidate anchor paths may be associated with a corresponding table to generate. In some embodiments, the non-transitory computer readable medium stores instructions when executed by the one or more processors cause the one or more processors to determine, from a set of candidate object paths, an object path for the data object. Each of the set of candidate object paths may be associated with a column of a corresponding table to generate. In some embodiments, the non-transitory computer readable medium stores instructions when executed by the one or more processors cause the one or more processors to generate, a row of a table associated with the anchor path. The row may include a value of the data object at a column associated with the object path.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification, illustrate an embodiment of the invention, and, together with the specification, explain the invention.

FIG. 6 illustrates configuration data, in accordance with an embodiment.

FIG. 7 illustrates hierarchical data, in accordance with an embodiment.

FIG. 8 illustrates relational data, in accordance with an embodiment.

DETAILED DESCRIPTION

Figure 1:
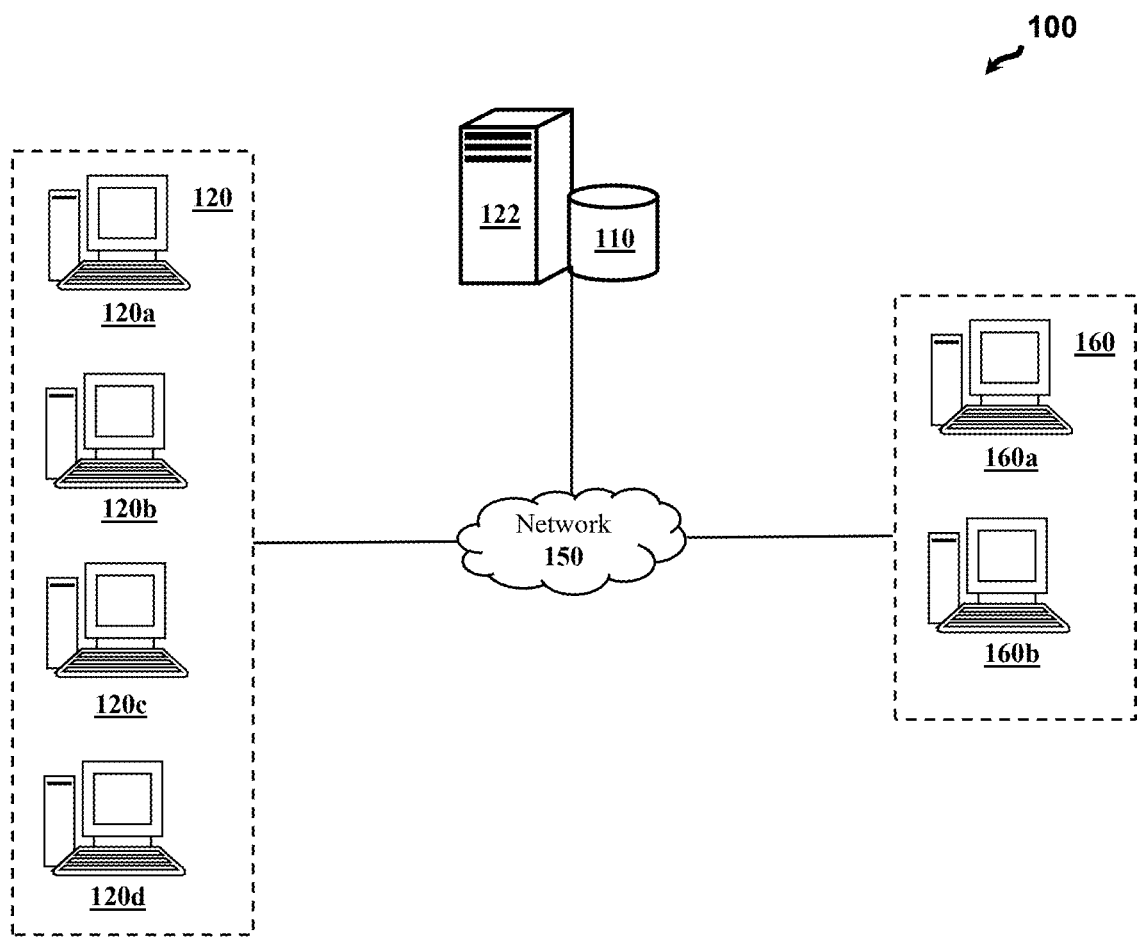
FIG. 1 illustrates a computer environment including a data conversion device for converting hierarchical data into relational data, in accordance with an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Various embodiments disclosed herein are related to systems and methods of converting hierarchical data into relational data. In some embodiments, a system receives hierarchical data including a set of data objects having a hierarchical relationship. A data object can be a key-value pair of information (e.g., numeric value, character, an array of values, etc.) to store or can be a nested data structure. A nested data structure may be a child data structure within its parent data structure. The system can obtain a data object of the set of data objects in the hierarchical data. For the data object, the system can determine an anchor path and an object path. An anchor path may indicate or may be associated with a corresponding table to generate. An object path may indicate or may be associated with a corresponding column of the table to generate. The system can determine, from a set of candidate anchor paths, the anchor path for the data object. In addition, the system can determine, from a set of candidate object paths, the object path for the data object. The system can generate a row of the table associated with the anchor path, where the row may include a value of the data object at a column associated with the object path.

Advantageously, the disclosed system can improve computational efficiency for big data analysis. In one aspect, the disclosed system can convert hierarchical data into relational data including one or more tables. Examples of hierarchical data include JSON data or XML data. Examples of relational data include structured query language (SQL) data or DB2 data. In one aspect, hierarchical data can represent or indicate hierarchical relationships of various data structures. However, hierarchical data may be inefficient for searching or querying in a large database. Meanwhile, relational data may be more efficient than hierarchical data for searching or querying in a large database. Hence, by converting hierarchical data into relational data, a big data analysis can be performed promptly.

In one aspect, the system can automatically convert hierarchical data into relational data based on configuration data. The configuration data may include a set of candidate anchor paths and a set of candidate object paths. The configuration data can be generated manually based on a user input. Additionally or alternatively, the configuration data can be generated automatically by analyzing keys of data objects and hierarchical relationships of the data objects in a sample data set or a training data set. According to the configuration data, the system can automatically process the hierarchical data to generate one or more tables corresponding to relational data. For example, the system can determine or map a data object in a hierarchical data to a corresponding table and a corresponding column by determining an anchor path and an object path associated with the data object. By determining the anchor path and the object path associated with the data object, the system can add a value of the data object to a table associated with the anchor path at a column associated with the object path. Accordingly, the system can automatically generate relational data for a large amount of hierarchical data (e.g., over 100 TB) in a prompt manner (e.g., within a few minutes).

FIG. 1 illustrates components of a computer system environment 100, according to an embodiment. The computer system environment 100 may include user devices 120a-d, data conversion devices 160a-b (collectively referred to as "a data conversion device 160"), a server 122, a database 110, and a network 150. The computer system environment 100 may not be confined to the components described herein and may include additional or alternate components, not shown for brevity, which is to be considered within the scope of the embodiment. Embodiments may include or otherwise implement any number of devices capable of performing the various features and tasks described herein. In one example, FIG. 1 shows the server 122 as a distinct computing device. Additionally or alternatively, the server 122 may be implemented as a distributed system or as a single device. Embodiments may comprise additional or alternative components, or may omit certain components and still fall within the scope of this disclosure.

The user devices 120, the data conversion device 160, the server 122, and the database 110 may communicate with each other via communication links of the network 150. The network 150 may be a public or private network, and the communications links that connect to network 150 may be wired or wireless. Non-limiting examples of the network 150 may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The user device 120 may be any computing device comprising a processor and a non-transitory machine-readable storage medium capable of performing the various tasks and processes described herein. Non-limiting examples of a user device 120 may be a workstation computer, laptop computer, tablet computer, and server computer. The user device 120 may be operated by one or more users of a network. The user device 120 may transmit data to the server 122 to store. Alternatively or additionally, the user device 120 may transmit the data to the data conversion device 160.

The server 122 may be any computing device comprising a processor and non-transitory machine-readable storage capable of executing the various tasks and processes described herein. The server 122 can receive data from user devices 120 and generate hierarchical data to store by the database 110. Hierarchical data may include a set of data objects having a hierarchical relationship. A data object can be a key-value pair of information (e.g., numeric value, character, etc.) to store or can be a nested data structure. A nested data structure may be a data structure within its parent data structure. The server 122 can provide the hierarchical data to the data conversion device 160 and in return receive relational data corresponding to the hierarchical data. Relational data may have one or more tables. The server 122 can store the relational data by the database 110.

The database 110 may be a computing device configured to store, manage, and/or organize network data and/or user data. The database 110 may be embodied as a single storage device. Alternatively, the database 110 may be embodied as distributed storage devices. In one aspect, the database 110 can store hierarchical data and relational data. In some embodiments, the database 110 includes different storage devices to store different types of data. For example, a first storage device can be implemented to store hierarchical data, whereas a second storage device can be implemented to store relational data.

The data conversion device 160 may be any computing device comprising a processor and a non-transitory machine-readable storage medium capable of performing the various tasks and processes described herein. Non-limiting examples of the data conversion device 160 may be a workstation computer, laptop computer, tablet computer, and server computer. The data conversion device 160 may be embodied as a single computing device or a group of computing devices 160*a*, 160*b*. In some embodiments, the data conversion device 160 is implemented as part of the server 122.

In some embodiments, the data conversion device 160 receives hierarchical data from the user device(s) 120 and/or the server 122. The data conversion device 160 can generate relational data corresponding to the hierarchical data. In one approach, the data conversion device 160 can determine, for a data object, a corresponding anchor path, and a corresponding object path. An anchor path may indicate or may be associated with a corresponding table for the data object. In one approach, the data conversion device 160 can determine an anchor path of a data object based on keys of parent data structures. An object path may indicate or may be associated with a corresponding column of a table for the data object. In one approach, the data conversion device 160 can determine an object path of a data object based on a key of the data object and an anchor path. In one example, an object path of a data object is a concatenated value of the anchor path of the data object and the key of the data object. By determining the anchor path and the object path, the data conversion device 160 can generate a row of a table associated with the anchor path, where the row may include a value of the data object at a column associated with the object path. The data conversion device 160 can generate an instruction or a message including the row and provide the message or the instruction to the server 122 to cause the server 122 to store the row by the database 110. Detailed descriptions of the implementation and operation of the data conversion device 160 are provided below with respect to FIGS. 2-8.

Figure 2:
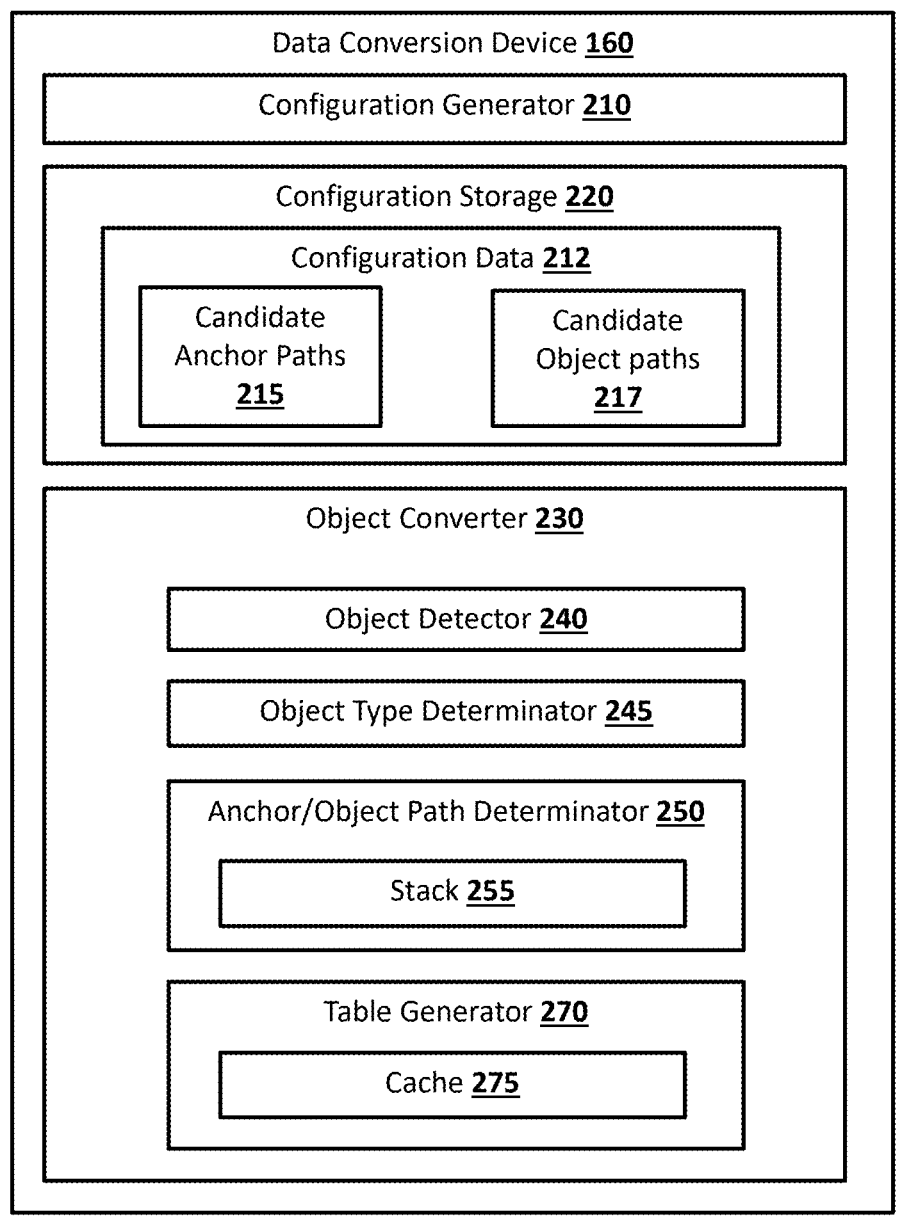
FIG. 2 illustrates a data conversion device, in accordance with an embodiment.

FIG. 2 illustrates a data conversion device 160, in accordance with an embodiment. In some embodiments, the data conversion device 160 includes a configuration generator 210, a configuration storage 220, and an object converter 230. These components may operate together to receive the hierarchical data and generate the relational data corresponding to the hierarchical data. These components may be embodied as hardware components, software components, or a combination of hardware components and software components. Some of these components may be formed by the processor executing one or more instructions stored by the storage. In some embodiments, the data conversion device 160 includes more, fewer, or different components than shown in FIG. 2. For example, the data conversion device 160 may lack the configuration generator 210, and the configuration generator 210 can be implemented by a device separate or distinct from the data conversion device 160.

The configuration generator 210 is a component that can generate configuration data 212. The configuration data 212 may include a set of candidate anchor paths 215 and a set of candidate object paths 217. The configuration data 212 may also include information indicating, for each table, a table name, a number of columns to generate, column names, and/or any additional data or values to add to the table (e.g., one or more columns indirectly obtained from data objects or predefined values). The configuration data 212 can be generated manually based on a user input. In one example, the configuration generator 210 may generate or present a user interface that allows a user to provide or specify candidate anchor paths 215 and candidate object paths 217. Additionally or alternatively, the configuration generator 210 can automatically generate configuration data 212. For example, the configuration generator 210 can receive a sample data set or a training data set. The configuration generator 210 can analyze keys of data objects and hierarchical relationships of data objects in the sample data set or the training data set. In some embodiments, the configuration generator 210 can utilize or share components (e.g., the object detector 240, object type determinator 245, an anchor/object path determinator 250) of the object converter 230 to automatically generate the configuration data 212. Detailed descriptions of an example of automatically generating configuration data are provided below with respect to FIG. 4.

In one aspect, the configuration generator 210 generates different configuration data for different sets of hierarchical data. For example, the configuration generator 210 can generate a first configuration data for a first hierarchical data (or a first set of data objects in hierarchical data) and generate a second configuration data for a second hierarchical data (or a second set of data objects in hierarchical data). The configuration generator 210 can generate, for each configuration data, a corresponding configuration identifier identifying or indicating the configuration data. The configuration identifier may indicate or correspond to a corresponding hierarchical data (or a corresponding set of data objects). The configuration generator 210 can store the configuration data with the corresponding configuration identifier by the configuration storage 220.

The configuration storage 220 may store the configuration data 212. The configuration storage 220 may receive configuration data 212 from the configuration storage 220 and store the received configuration data 212. Alternatively or additionally, the configuration storage 220 may receive configuration data 212 from another computing device and store the received configuration data 212. The configuration storage 220 may be hardware storage within the processor, a part of the storage, or a combination of them. The configuration storage 220 may store a set of candidate anchor paths 215 and a set of candidate object paths 217. The configuration storage 220 may provide configuration data when requested. In one example, a request for configuration data may include a configuration identifier for a set of data objects. The configuration storage 220 may search for or identify a corresponding configuration data associated with the configuration identifier and provide the identified configuration data.

The object converter 230 is a component that can generate relational data corresponding to hierarchical data. In some embodiments, the object converter 230 includes an object detector 240, an object type determinator 245, an anchor/object path determinator 250, and a table generator 270. These components may operate together to receive or obtain hierarchical data and generate relational data corresponding to the hierarchical data. In some embodiments, the object converter 230 includes more, fewer, or different components than shown in FIG. 2.

The object detector 240 is a component that can detect or obtain a data object from input data. The input data can be JSON or XML data. The input data may include a set of data objects having hierarchical relationships. From the set of data objects, the object detector 240 can detect or identify a data object. For example, the object detector 240 can detect each row or each line of the JSON or XML data as a data object. For example, the object detector 240 can detect or identify a data object separated or indicated by a predetermined delimiter (e.g., ",", ";" a hidden next line character, etc.).

The object type determinator 245 is a component that can determine a type of data object. Examples of a type of data object include a character, a Boolean value, a numerical value (e.g., an integer or floating value), an array of values, or a data structure. The object type determinator 245 can determine, for a data object identified or obtained by the object detector 240, a corresponding type. In one aspect, the object type determinator 245 can determine a type of data object by analyzing whether a value of the data object includes a character string, a Boolean value, a numerical value, an array or values, or a nested data structure. In one aspect, the object type determinator 245 can determine a data object is a data structure by detecting a predetermined delimiter (e.g., bracket or "{", "}"). According to the type of the data object, the data object can be processed differently by the table generator 270.

The anchor/object path determinator 250 is a component that can determine, for a detected data object, an anchor path, and an object path. In one aspect, the anchor/object path determinator 250 includes or is coupled to a stack 255. The stack 255 can be a queue (e.g., a last in first out (LIFO) queue). In one approach, when the object detector 240 detects a data object, the anchor/object path determinator 250 can push a key of the data to object to the stack 255 to track a hierarchical relationship of the data object in the set of data objects. For example, when a detected data object is a data structure, the anchor/object path determinator 250 can push a key (or an identification) of the data structure to the stack 255. For example, the anchor/object path determinator 250 can generate an entry in the stack 255 including the key (or an identification) of the data structure to push the key (or an identification) of the data structure to the stack 255. After processing all elements or data objects in a data structure, the anchor/object path determinator 250 can pop the key (or an identification) of the data structure from the stack 255. For example, the anchor/object path determinator 250 can remove the entry in the stack 255 including the key (or an identification) of the data structure to pop the key (or an identification) of the data structure from the stack 255. When a detected data object is a key-value pair of a non-data structure object (e.g., characters, numerical values, etc.), the anchor/object path determinator 250 can push a key (or an identification) of the data object to the stack 255. For example, the anchor/object path determinator 250 can generate an entry in the stack 255 including the key (or an identification) of the data object to push the key (or an identification) of the data object to the stack 255. When a value of the data object is processed or cached, the anchor/object path determinator 250 can pop the key (or an identification) of the data object from the stack 255. For example, the anchor/object path determinator 250 can remove the entry in the stack 255 including the key (or an identification) of the data object to pop the key (or an identification) of the data object from the stack 255.

In one aspect, according to entries in the stack 255, the anchor/object path determinator 250 can determine an anchor path and an object path. The anchor path and the object path may indicate a hierarchical relationship of a data object within a large set of data objects. In one aspect, the anchor/object path determinator 250 can concatenate entries of the stack 255 including a last entry or a key of a data object to obtain first concatenated keys. The anchor/object path determinator 250 can compare the first concatenated keys with a set of candidate object paths 217 and determine or identify a candidate object path 217 matching the first concatenated keys as an object path of the data object. Similarly, the anchor/object path determinator 250 can concatenate entries of the stack 255 without the last entry or the key of the data object to obtain second concatenated keys. The anchor/object path determinator 250 can compare the second concatenated keys with a set of candidate anchor paths 215 and determine or identify a candidate anchor path 215 matching the second concatenated keys as an anchor path of the data object. In one approach, the anchor/object path determinator 250 may append a key of the data object to an anchor path of the data object to obtain the object path of the data object.

The table generator 270 is a component that can generate relational data having one or more tables. The relational data may be SQL data or DB2 data. The table generator 270 can include or can be communicatively coupled to a cache memory 275. The table generator 270 can store a value of a data object, an indication of the table (or the anchor path), and an indication of the column (or the object path) by the cache memory 275. When sufficient values of data objects of a row of a table are stored by the cache memory 275, the table generator 270 can generate the row of the table including values of the data objects at respective columns. After generating the row of the table, the table generator 270 may clear or empty a portion of the cache memory 275 that stored data for generating the row. The table generator 270 can repeat the process for other data objects to generate additional rows of the table. Similarly, the table generator 270 can repeat the process for other data objects to generate additional tables. Detailed descriptions on an example of generating relational data for hierarchical data is provided below with respect to FIGS. 3 and 5.

Advantageously, the data conversion device 160 can improve computational efficiency for a big data analysis. In one aspect, the data conversion device 160 can convert hierarchical data into relational data including one or more tables. In one aspect, hierarchical data can represent or indicate hierarchical relationships of various data structures. However, hierarchical data may be inefficient for searching or querying in a large database. Meanwhile, relational data may be more efficient than hierarchical data for searching or querying in a large database than. Hence, by converting hierarchical data into relational data, a big data analysis can be performed promptly.

In one aspect, the data conversion device 160 can automatically convert hierarchical data into relational data based on configuration data 212. According to the configuration data 212, the data conversion device 160 can automatically process the hierarchical data to generate one or more tables corresponding to relational data. For example, the data conversion device 160 can determine or map a data object in a hierarchical data to a corresponding table and a corresponding column by determining an anchor path and an object path associated with the data object. By determining the anchor path and the object path associated with the data object, the data conversion device 160 can add a value of the data object to the a table associated with the anchor path at a column associated with the object path. Accordingly, the data conversion device 160 can automatically generate relational data for a large amount of hierarchical data (e.g., over 100 TB) in a prompt manner (e.g., within a few minutes).

Figure 3:
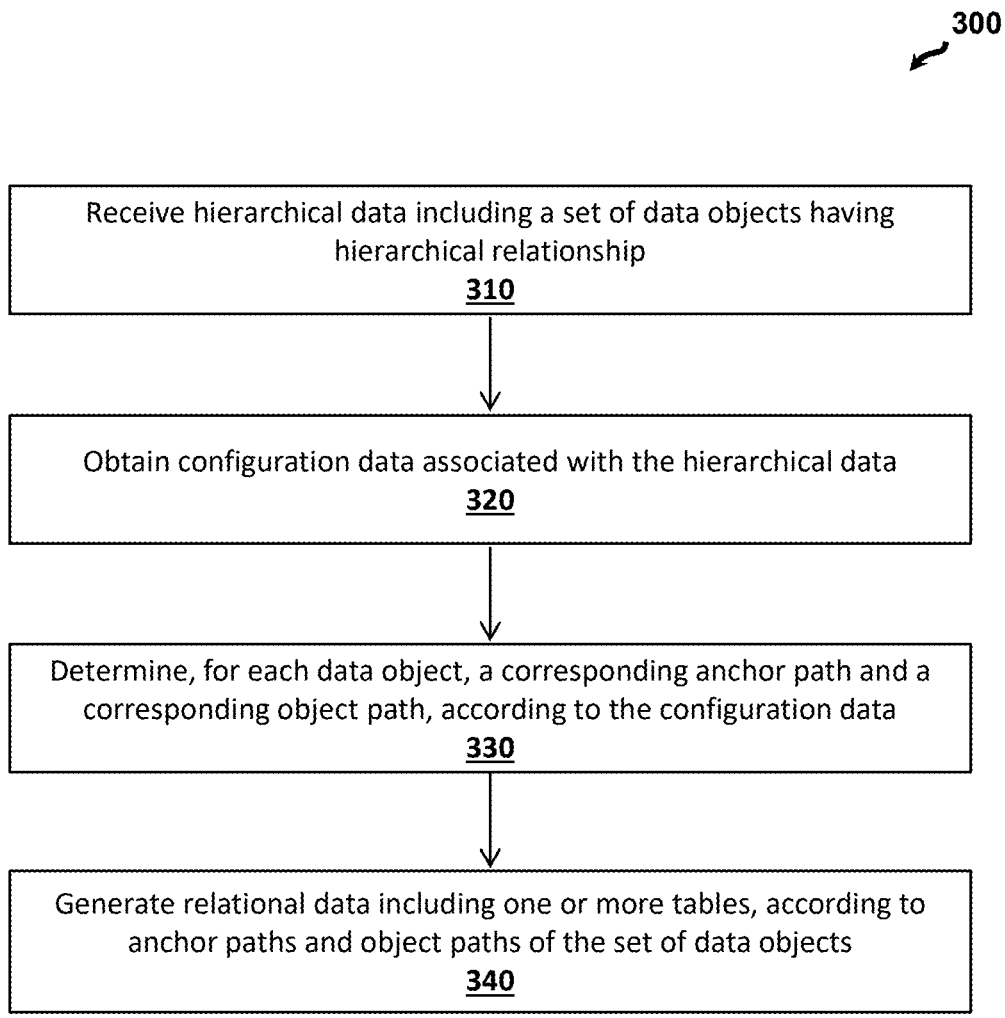
FIG. 3 illustrates a method of converting hierarchical data into relational data, in accordance with an embodiment.

FIG. 3 illustrates a method 300 of converting hierarchical data into relational data, in accordance with an embodiment. The method 300 may be performed by the data conversion device 160 (or object converter 230). In some embodiments, the method 300 is performed by other entities. In some embodiments, the method 300 includes more, fewer, or different steps than shown in FIG. 3. For example, the step 310 may be omitted or performed by a different entity.

At step 310, the data conversion device 160 receives hierarchical data including a set of data objects having hierarchical relationship. Hierarchical data may include a set of data objects having hierarchical relationship. A data object can be a key-value pair of information (e.g., numeric value, character, etc.) to store or can be a nested data structure. A nested data structure may be a data structure within its parent data structure. Hierarchical data may be JSON data or XML data.

At step 320, the data conversion device 160 obtains configuration data 212 including a set of data objects having hierarchical relationship. The configuration data 212 may include a set of candidate anchor paths 215 and a set of candidate object paths 217. The configuration data 212 can be generated manually based on a user input. Additionally or alternatively, the configuration data 212 can be automatically generated as described below with respect to FIG. 4. In one approach, the data conversion device 160 obtains or retrieves configuration data 212 from the configuration storage 220. The configuration storage 220 may store different configuration data, where each configuration data 212 may be associated with a corresponding hierarchical data or a corresponding set of data objects in the hierarchical data. For the set of data objects in the hierarchical data, the data conversion device 160 may determine a corresponding identifier. The data conversion device 160 may provide or apply the determined identifier to the configuration storage 220 and receive a corresponding configuration data associated with the identifier from the configuration storage 220.

At step 330, the data conversion device 160 determines, for each data object, a corresponding anchor path, and a corresponding object path, according to the configuration data 212. An anchor path may indicate or may be associated with a corresponding table for a data object. An object path may indicate or may be associated with a corresponding column of a table for the data object. In one approach, the data conversion device 160 can track the hierarchical relationship of data objects in the set of data objects by determining anchor paths and object paths. An example of tracking hierarchical relationships of data objects is provided below with respect to FIG. 5.

At step 340, the data conversion device 160 generates relational data including one or more tables, according to anchor paths and object paths of the set of data objects. In one approach, the data conversion device 160 can generate a row of a table associated with an anchor path, where the row may include values of data objects at corresponding columns associated with object paths of the data objects. For example, the data conversion device 160 can process each data object and temporarily store, for each data object, a corresponding value of the data object, a corresponding anchor path, and a corresponding object path by the cache memory 275. When sufficient values of data objects to generate a row of a table are stored by the cache memory 275, the data conversion device 160 can generate the row of the table and clear a portion of the cache memory 275 that stored data for generating the row of the table. An example of generating relational data is provided below with respect to FIG. 5.

Figure 4:
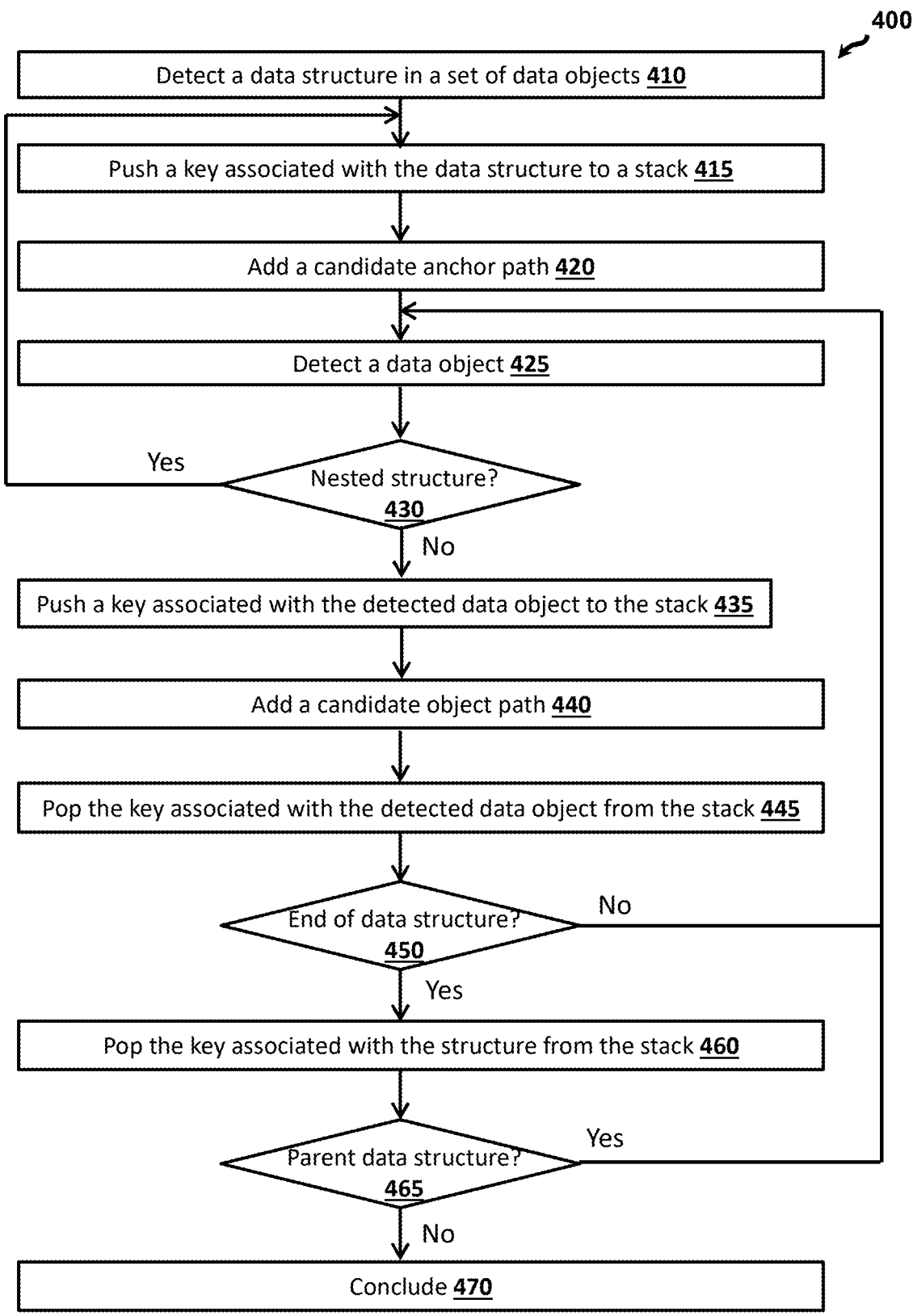
FIG. 4 illustrates a method of generating configuration data for converting hierarchical data into relational data, in accordance with an embodiment.

FIG. 4 illustrates a method 400 of automatically generating configuration data for converting hierarchical data into relational data, in accordance with an embodiment. The method 400 may be performed by the configuration generator 210. In some embodiments, the method 400 is performed by other entities. In some embodiments, the method 400 includes more, fewer, or different steps than shown in FIG. 4.

At step 410, the configuration generator 210 detects a data structure in a sample data. The sample data or the training data may be a subset of a large set of data objects in hierarchical data (e.g., JSON data or XML data). For example, the object detector 240 can detect a data object in the sample data, and the object type determinator 245 can determine the data object is a data structure by detecting an opening bracket (e.g., "{") following a key or an identification of the data object.

At step 415, in response to detecting the data structure, the anchor/object path determinator 250 can push a key or an identification of the data structure to the stack 255. For example, the anchor/object path determinator 250 can add or generate an entry in the stack 255 including the key (or an identification) of the data structure to push the key (or an identification) of the data structure to the stack 255. If there is no key or identification detected for the data structure, the anchor/object path determinator 250 may not generate a new entry in the stack 255.

At step 420, the configuration generator 210 adds a candidate anchor path 215 to the configuration storage 220. For example, in response to pushing the key or the identification of the data structure to the stack 255, the configuration generator 210 can concatenate entries of the stack 255. Values of two concatenated entries may be separated by a predetermined character (e.g., period or "."). The configuration generator 210 can store the concatenated keys or the concatenated entries of the stack 255 by the configuration storage 220 as a candidate anchor path 215 associated with the data structure.

At step 425, the configuration generator 210 detects a subsequent data object or a new data object in the sample data. For example, the object detector 240 can detect the subsequent data object separated from the previous data object by a predetermined delimiter (e.g., ",", ";" a hidden next line character, etc.). If a data object is not detected, then the configuration generator 210 may proceed to step 450.

At step 430, the configuration generator 210 detects whether the new data object is a nested data structure within its parent data structure. For example, the object type determinator 245 can determine the new data object is a data structure (or a nested data structure) by detecting a bracket (e.g., "{") following a key or an identification of the data object, or by analyzing values of the new data object. In response to determining that the new data object is a nested data structure, the configuration generator 210 may proceed to the step 415. In response to determining that the new data object is not a nested data structure, the configuration generator 210 may proceed to step 435.

At step 435, the configuration generator 210 pushes a key associated with a non-data structure object detected in the step 425. A non-data structure object can be a character, a Boolean value, or a numerical value (e.g., an integer or floating value). For example, the anchor/object path determinator 250 can add or generate an entry in the stack 255 including the key (or an identification) of the detected data object (or the non-data structure object) to push the key (or an identification) of the detected data object (or the non-data structure object) to the stack 255.

At step 440, the configuration generator 210 adds a candidate object path 217 for a detected data object (or the non-data structure object) to the configuration storage 220. For example, in response to pushing the key or the identification of the detected data object (or the non-data structure object) to the stack 255, the configuration generator 210 can concatenate entries of the stack 255. Values of two concatenated entries may be separated by a predetermined character (e.g., period or "."). The configuration generator 210 can store the concatenated keys or the concatenated entries of the stack 255 by the configuration storage 220 as a candidate object path 217 associated with the detected data object (or the non-data structure object).

At step 445, the configuration generator 210 pops the key associated with the detected data object from the stack 255. For example, in response to adding the candidate object path 217 at step 440, the configuration generator 210 can remove an entry in the stack 255 including the key (or an identification) of the detected data object (or the non-data structure object).

At step 450, the configuration generator 210 determines whether an end of the data structure is reached, or determines whether an additional data object in the data structure exists or not. For example, the object type determinator 245 can determine whether a closing bracket (e.g., "}") is followed by the data object detected in the step 425. If a closing bracket is followed by the data object detected in the step 425, then the configuration generator 210 may determine that an end of the data structure is reached and proceed to step 460. If a closing bracket is not followed by the data object detected in the step 425, then the configuration generator 210 may determine that an end of the data structure is not reached and proceed to step 425 to detect a subsequent data object within the data structure.

At step 460, the configuration generator 210 pops the key or the identification associated with the data structure from the stack 255. For example, in response to determining that an end of the data structure is reached at step 450, the configuration generator 210 can remove an entry in the stack 255 including the key (or an identification) of the data structure.

At step 465, the configuration generator 210 determines whether a parent data structure exists or not. For example, the configuration generator 210 can determine whether the stack 255 is empty or not. If the stack 255 is empty, the configuration generator 210 may determine that no parent data structure exists and proceed to step 470. If the stack 255 includes an entry, the configuration generator 210 may determine that a parent data structure associated with a key in the entry exists and proceed to step 425 for the parent structure.

At step 470, the configuration generator 210 concludes the method 400 of generating configuration data 212 for the data structure detected at step 410. The configuration generator 210 may generate an identifier for the candidate anchor path(s) 215 and the candidate object path(s) 217 added, such that the corresponding candidate anchor path(s) 215 and candidate object path(s) 217 can be later retrieved, when converting hierarchical data into relational data. The configuration generator 210 may repeat the method 400 for a different data structure of the set of data objects or a different set of data objects.

Figure 5:
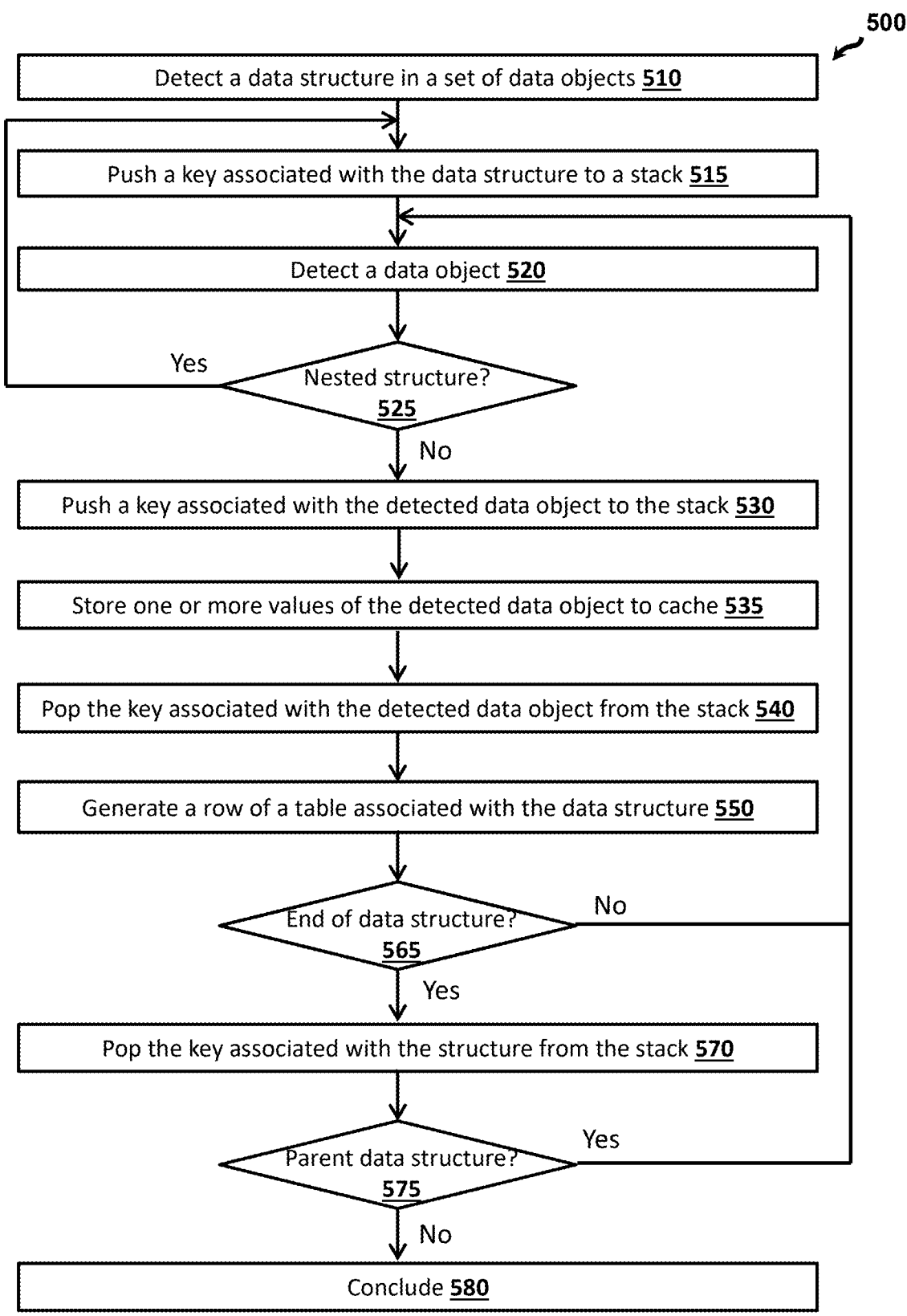
FIG. 5 illustrates a method of converting hierarchical data into relational data, in accordance with an embodiment.

FIG. 5 illustrates a method 500 of converting hierarchical data into relational data, in accordance with an embodiment. The method 500 may be performed by the data conversion device 160 (or object converter 230). In some embodiments, the method 500 is performed by other entities. In some embodiments, the method 500 includes more, fewer, or different steps than shown in FIG. 5. For example, the object converter 230 may obtain configuration data 212 including a set of candidate anchor paths 215 and a set of candidate object paths 217 for a set of data objects in hierarchical data received.

At step 510, the object detector 240 detects a data structure in hierarchical data. The hierarchical data may be JSON data or XML data. In one approach, the object detector 240 can detect a data object from a set of data objects in the hierarchical data, and the object type determinator 245 can determine the data object is a data structure by detecting an opening bracket (e.g., "{") followed by a key or an identification of the data object.

At step 515, in response to detecting the data structure, the anchor/object path determinator 250 can push a key or an identification of the data structure to the stack 255. For example, the anchor/object path determinator 250 can add or generate an entry in the stack 255 including the key (or an identification) of the data structure to push the key (or an identification) of the data structure to the stack 255. If there is no key or identification for the data structure, the anchor/object path determinator 250 may not generate a new entry in the stack 255.

At step 520, the object detector 240 detects a subsequent data object or a new data object. For example, the object detector 240 can detect the subsequent data object separated from the previous data object by a predetermined delimiter (e.g., ",", ";", a hidden next line character, etc.). If a data object is not detected, then the object converter 230 may proceed to step 565.

At step 525, the object converter 230 detects whether the new data object is a nested data structure within its parent data structure. For example, the object type determinator 245 can determine the new data object is a data structure (or a nested data structure) by detecting an opening bracket (e.g., "{") followed by a key or an identification of the data object, or by analyzing values of the new data object. In response to determining that the new data object is a nested data structure, the object converter 230 may proceed to the step 515. In response to determining that the new data object is not a nested data structure, the object converter 230 may proceed to step 530.

At step 530, the object converter 230 pushes a key associated with a non-data structure object detected in the step 520. A non-data structure object can be a character, a Boolean value, a numerical value (e.g., an integer or floating value), or an array of values. For example, the anchor/object path determinator 250 can add or generate an entry in the stack 255 including the key (or an identification) of the detected data object (or the non-data structure object) to push the key (or an identification) of the detected data object (or the non-data structure object) to the stack 255.

At step 535, the object converter 230 stores one or more values of the detected data object by a cache memory 275.

In one approach, the object converter 230 can determine an anchor path and an object path of the data object and store a value of the data object, the anchor path and the object path by the cache memory 275. In one aspect, an anchor path may indicate a table and an object path may indicate a column of the table. For example, in response to pushing the key or the identification of the detected data object (or the non-data structure object) to the stack 255, the anchor/object path determinator 250 can identify an object path associated with the data object by concatenating keys or entries of the stack 255 to obtain first concatenated keys or first concatenated entries. Values of two concatenated entries may be separated by a predetermined character (e.g., period or "."). The anchor/object path determinator 250 can determine or identify a candidate object path 217 of the set of candidate object paths 217 matching the first concatenated keys or first concatenated entries as an object path of the data object. In addition, the anchor/object path determinator 250 can identify an anchor path associated with the data object by concatenating keys or entries of the stack 255 without the last entry or the key of the data object to obtain second concatenated keys or second concatenated entries. Similarly, values of two concatenated entries may be separated by a predetermined character (e.g., period or "."). The anchor/object path determinator 250 can determine or identify a candidate anchor path 215 of the set of candidate anchor paths 215 matching the second concatenated keys or second concatenated entries as an anchor path of the data object. The object converter 230 can store a value (e.g., character, numerical value, an array of values) of the data object, the object path of the data object, and the anchor path of the data object by the cache memory 275.

At step 540, the object converter 230 pops the key associated with the detected data object from the stack 255. For example, in response to storing one or more values of the detected data object by the cache memory 275 at step 535, the object converter 230 can remove an entry in the stack 255 including the key (or an identification) of the detected data object (or the non-data structure object).

At step 550, the object converter 230 generates a row of a table associated with the data structure. For example, the object converter 230 determines whether sufficient values for columns of a row of a table are cached by the cache memory 275. In one approach, the object converter 230 can compare candidate object paths 217 of a table in the configuration data 212 and object paths cached by the cache memory 275. If the candidate object paths 217 of a table match the object paths cached by the cache memory 275, the object converter 230 may determine that sufficient values for columns of a row of a table are cached by the cache memory 275. In response to determining that sufficient values for the row are cached, the object converter 230 can generate the row of the table indicated by the anchor path, where the row can include cached values of data objects at corresponding columns indicated by corresponding object paths. The object converter 230 can also add one or more columns including values indirectly obtained or calculated from the cached values of the data objects or predefined value, as indicated by the configuration data 212. In response to generating the row of the table, the object converter 230 can clear a portion of the cache memory 275 that stored data for generating the row of the table.

At step 565, the object converter 230 determines whether an end of the data structure is reached, or determines whether an additional data object in the data structure exists or not. For example, the object type determinator 245 can determine whether a closing bracket (e.g., "}") is followed by the data object detected in the step 520. If a closing bracket is followed by the data object, then the object converter 230 may determine that an end of the data structure is reached and proceed to step 570. If a closing bracket is not followed by the data object, then the object converter 230 may determine that an end of the data structure is not reached and proceed to step 520 to detect a subsequent data object within the data structure.

At step 570, the object converter 230 pops the key or the identification associated with the data structure from the stack. For example, in response to determining that an end of the data structure is reached at step 565, the object converter 230 can remove an entry in the stack 255 including the key (or an identification) of the data structure.

At step 575, the object converter 230 determines whether a parent data structure exists or not. For example, the object converter 230 can determine whether the stack 255 is empty or not. If the stack 255 is empty, the object converter 230 may determine that no parent data structure exists and proceed to step 580. If the stack 255 includes an entry, the object converter 230 may determine that a parent data structure associated with a key of the entry exists and proceed to step 520 for the parent structure.

At step 580, the object converter 230 concludes the method 500 of generating configuration data for the data structure detected at step 510. The object converter 230 may repeat the method 500 for a different data structure of the set of data objects or a different set of data objects.

FIG. 6 illustrates an example configuration data 600, in accordance with an embodiment. In one example, the configuration data 600 includes anchor path mappings 610, 620, 630, and object path mappings 612, 614, 622, 624, 626, 628, 632, 634, 636. Each anchor path mapping may include a name of a table and a corresponding candidate anchor path. Each object path mapping may include a name of a column and a corresponding candidate object path. According to the configuration data 600, the data conversion device 160 can generate relational data including one or more tables based on a set of data objects in hierarchical data.

In one example, the anchor path mapping 610 and the object path mappings 612, 614 are associated with a table "COLLECTION." A value of the candidate anchor path in the anchor path mapping 610 may be null data to indicate a root path. The candidate object paths in the object path mappings 612, 614 may be associated with respective columns of the table "COLLECTION." A column "NAME" of the table "COLLECTION" is associated with an object path "name" as indicated by the object path mapping 612. A column "ID" of the table "COLLECTION" is associated with an object path "id" as indicated by the object path mapping 614. Accordingly, the data conversion device 160 can detect data objects with object paths "name" and "id" for the table "COLLECTION," according to the candidate anchor path in the anchor path mapping 610 and the candidate object paths in the object path mappings 612, 614.

In one example, the anchor path mapping 620 and the object path mappings 622, 624, 626, and 628 are associated with a table "ALBUM." A value of the candidate anchor path in the anchor path mapping 620 may be "album" to indicate its child relationship to the root path. The candidate object paths in the object path mappings 622, 624, 626, 628 may be associated with respective columns of the table "ALBUM." A column "TITLE" of the table "ALBUM" is associated with an object path "album. title" as indicated by the object path mapping 622. A column "ARTIST" of the table "ALBUM" is associated with an object path "album. artist" as indicated by the object path mapping 624. A column "GENRE" of the table "ALBUM" is associated with an object path "album. genre" as indicated by the object path mapping 626. A column "ID" of the table "ALBUM" is associated with an object path "album. id" as indicated by the object path mapping 628. Accordingly, the data conversion device 160 can detect data objects with object paths "album. title," "album. artist," "album. genre," "album. id" for the table "ALBUM," according to the candidate anchor path in the anchor path mapping 620 and the candidate object paths in the object path mappings 622, 624, 626, 628.

In one example, the anchor path mapping 630 and the object path mappings 632, 634, and 636 are associated with a table "TRACK." A value of the candidate anchor path in the anchor path mapping 630 may be "album. track" to indicate its child relationship to the anchor path "album". The candidate object paths in the object path mappings 632, 634, 636, may be associated with respective columns of the table "TRACK." A column "NAME" of the table "TRACK" is associated with an object path "album.track.name" as indicated by the object path mapping 632. A column "POSITION" of the table "TRACK" is associated with an object path "album.track.position" as indicated by the object path mapping 634. A column "ID" of the table "TRACK" is associated with an object path "album. id" as indicated by the object path mapping 636. Accordingly, the data conversion device 160 can detect data objects with object paths "album.track.name," "album.track.position," "album. id" for the table "TRACK," according to the candidate anchor path in the anchor path mapping 610 and the candidate object paths in the object path mappings 632, 634, and 636.

FIG. 7 illustrates an example input file or hierarchical data 700, in accordance with an embodiment. In one example, the hierarchical data 700 includes a data structure 710. The data structure 710 has no key or is associated with a root path. The data structure 710 includes non-data structure objects 712, 714, and an array of nested data structures 720, 770. Each of the non-data structure objects 712, and 714 has a key-value pair. For example, the non-data structure object 712 has a key "name" and a value "mike's collection." For example, the non-data structure object 714 has a key "id" and a value "1." The array of data structures 720, and 770 has or is associated with a key "album."

The data structure 720 includes non-data structure objects 722, 724, 726, 728, and an array of nested data structures 730, 740, 750. Each of the non-data structure objects 722, 724, 726, 728 has a key-value pair. For example, the non-data structure object 722 has a key "title" and a value "MyTitle1." For example, the non-data structure object 724 has a key "artist" and a value "Artist1." For example, the non-data structure object 726 has a key "genre" and a value "Genre1." For example, the non-data structure object 728 has a key "id" and a value "10001." The array of data structures 730, 740, and 750 has or is associated with a key "track."

The data structure 730 includes non-data structure objects 732, 734. Each of the non-data structure objects 732, 734 has a key-value pair. For example, the non-data structure object 732 has a key "position" and a value "1." For example, the non-data structure object 734 has a key "name" and a value "Album1track1."

The data structure 740 includes non-data structure objects 742, 744. Each of the non-data structure objects 742, 744 has a key-value pair. For example, the non-data structure object 742 has a key "position" and a value "2." For example, the non-data structure object 744 has a key "name" and a value "Album1track2."

The data structure 750 includes non-data structure objects 752, 754. Each of the non-data structure objects 752, 754 has a key-value pair. For example, the non-data structure object 752 has a key "position" and a value "3." For example, the non-data structure object 754 has a key "name" and a value "Album1track3."

The data structure 770 includes non-data structure objects 772, 774, 776, and 778, and a nested data structure 780. Each of the non-data structure objects 772, 774, 776, and 778 has a key-value pair. For example, the non-data structure object 772 has a key "title" and a value "MyTitle2." For example, the non-data structure object 774 has a key "artist" and a value "Artist2." For example, the non-data structure object 776 has a key "genre" and a value "Genre2". For example, the non-data structure object 778 has a key "id" and a value "10002." The data structure 780 has or is associated with a key "track."

The data structure 780 includes non-data structure objects 782, 784. Each of the non-data structure objects 782 and 784 has a key-value pair. For example, the non-data structure object 782 has a key "position" and a value "1." For example, the non-data structure object 784 has a key "name" and a value "Album2track1."

FIG. 8 illustrates an example output or relational data 800 including tables 810, 820, and 830, in accordance with an embodiment. In one aspect, the data conversion device 160 can receive the hierarchical data 700 and generate the relational data 800, according to the configuration data 600.

In one example, the data conversion device 160 generates a row 812 of the table 810 for the data objects 712, 714. The table 810 has a name "COLLECTION" with a root path as an anchor path, as indicated or specified by the anchor path mapping 610. The data conversion device 160 can process or analyze data objects 712, 714 and generate the row 812 of the table 810, when sufficient column values "mike's collection" and "1" of the row 812 are cached by the cache memory 275, as indicated by the object path mappings 612, 614 of the configuration data 600.

In one example, the data conversion device 160 generates a row 822 of the table 820 for the data objects 722, 724, 726, 728. The table 820 has a name "ALBUM" with "album" as an anchor path, as indicated or specified by the anchor path mapping 620. The data conversion device 160 can process or analyze data objects 722, 724, 726, 728, and generate the row 822 of the table 820, when sufficient columns values "MyTitle1," "Artist1," "Genre1," and "10001" of the row 822 are cached by the cache memory 275, as indicated by the object path mappings 622, 624, 626, 628 of the configuration data 600.

In one example, the data conversion device 160 generates a row 832 of the table 830 for the data objects 732, 734, and 728. The data conversion device 160 can process or analyze data objects 732 and 734, and generate the row 832 of the table 830, when sufficient column values "Album1track1," "1," and "10001" of the row 832 are cached by the cache memory 275, as indicated by the object path mappings 632, 634, and 636 of the configuration data 600.

In one example, the data conversion device 160 generates an additional row 834 of the table 830 for the data objects 742, 744, 728. The data conversion device 160 can process or analyze data objects 742, 744, and generate the row 834 of the table 830, when sufficient column values "Album1track2," "2," and "10001" of the row 834 are cached by the cache memory 275, as indicated by the object path mappings 632, 634, 636 of the configuration data 600.

In one example, the data conversion device 160 generates an additional row 836 of the table 830 for the data objects 752, 754, 728. The data conversion device 160 can process or analyze data objects 752, 754, and generate the row 836 of the table 830, when sufficient column values "Album1track3," "3," and "10001" of the row 836 are cached by the cache memory 275, as indicated by the object path mappings 632, 634, 636 of the configuration data 600.

In one example, the data conversion device 160 generates an additional row 824 of the table 820 for the data objects 772, 774, 776, 778. The data conversion device 160 can process or analyze data objects 772, 774, 776, 778, and generate the row 824 of the table 820, when sufficient columns values "MyTitle2," "Artist2," "Genre2," and "10002" of the row 824 are cached by the cache memory 275, as indicated by the object path mappings 622, 624, 626, 628 of the configuration data 600.

In one example, the data conversion device 160 generates an additional row 838 of the table 830 for the data objects 782, 784, 778. The data conversion device 160 can process or analyze data objects 782, 784 and generate the row 838 of the table 830, when sufficient column values "Album2track1," "1," and "10002" of the row 838 are cached by the cache memory 275, as indicated by the object path mappings 632, 634, 636 of the configuration data 600.

Advantageously, the data conversion device 160 can automatically convert hierarchical data 700 into relational data 800 based on configuration data 600. For example, data conversion device 160 can track a location in a hierarchical relationship of a data object in the hierarchical data 700 and determine a corresponding anchor path and a corresponding object path of the data object. By determining the anchor path and the object path associated with the data object, the data conversion device 160 can add a value of the data object to the a table associated with the anchor path at a column associated with the object path. Accordingly, the data conversion device 160 can automatically generate relational data 800 for a large amount of hierarchical data 700 in a prompt manner (e.g., within a few minutes).

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, function, procedure, subroutine, subprogram, or the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that is accessible by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. "Disk" and "disc", as used herein, include compact disc (CD), laser disc, optical disc, digital versatile disc (DVD), floppy disk, and Blu-ray disc formats, wherein "disks" reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated.

The various aspects and embodiments disclosed are for purposes of illustration and are not intended to be limiting, with the true scope and spirit being indicated by the following claims.

What is claimed is:

1. A method, implemented in a computer system comprising one or more processors coupled with memory, comprising:
   receiving, by the one or more processors, via a network, a first file of a first format comprising hierarchical data including a set of data objects having a hierarchical relationship, each of set of data objects including at least one of a plurality of keys in accordance with the hierarchical relationship;
   obtaining, by the one or more processors, a data object of the set of data objects in the hierarchical data, the data object including a key of the plurality of keys and a value;
   determining, by the one or more processors, from a set of candidate anchor paths, an anchor path for the data object based on the hierarchical relationship of the key within the plurality of keys, each candidate anchor path of the set of candidate anchor paths associated with a respective table of a plurality of tables;
   determining, by the one or more processors, from a set of candidate object paths, an object path for the data object based on the key and the anchor path, each candidate object path of the set of candidate object paths associated with a respective column of one or more columns in a table of the plurality of tables associated with the anchor path;
   storing, by the one or more processors, on a cache memory, the value of the data object and an indication of a corresponding column associated with the object path;
   determining, by the one or more processors, that a minimum number of values for the one or more columns for a row that are stored in the cache memory;
   generating, by the one or more processors, responsive to determining that the minimum number of values are stored in the cache memory, the row of the table associated with the anchor path, wherein the row includes the value of the data object at the corresponding column associated with the object path;
   clearing, by the one or more processors, at least a portion of the cache memory in response to generating the row of the table, including the value of the data object at the corresponding column;
   storing, by the one or more processors, using a second file of a second format comprising relational data on a database, wherein the row includes the value of the data object at the corresponding column in the table of the plurality of tables; and
   maintaining, by the one or more processors, the plurality of tables on the database using the second file of the second format to be searchable for querying via the network.

2. The method of claim 1, further comprising:
   adding, by the one or more processors, an entry including the key of the data object to a stack;
   concatenating, by the one or more processors, keys in entries of the stack including the entry to obtain first concatenated keys; and
   determining, by the one or more processors, the object path from the set of candidate object paths matching the first concatenated keys.

3. The method of claim 2, further comprising:
   concatenating, by the one or more processors, existing keys in entries of the stack other than the entry to obtain second concatenated keys; and
   determining, by the one or more processors, the anchor path from the set of candidate anchor paths matching the second concatenated keys.

4. The method of claim 2,
   wherein storing the value of the data object and the indication of the column is performed, in response to determining the object path from the set of candidate object paths matching the first concatenated keys, and further comprising:
   removing, by the one or more processors, the entry including the key of the data object from the stack, in response to storing the value of the data object and the indication of the column by the cache memory.

5. The method of claim 1, further comprising:
   obtaining, by the one or more processors, another data object in the hierarchical data;
   determining, by the one or more processors, from the set of candidate object paths, another object path for the other data object; and
   generating, by the one or more processors, the row of the table including another value of the other data object at another column associated with the other object path.

6. The method of claim 1, further comprising:
   receiving, by the one or more processors, a user input specifying the set of candidate anchor paths and the set of candidate object paths; and
   generating, by the one or more processors, configuration data indicating the set of candidate anchor paths and the set of candidate object paths, according to the user input.

7. The method of claim 1, further comprising:
   analyzing, by the one or more processors, sample data;
   determining, by the one or more processors, the set of candidate anchor paths and the set of candidate object paths, based on the sample data; and
   generating, by the one or more processors, configuration data indicating the determined set of candidate anchor paths and the determined set of candidate object paths.

8. The method of claim 1, wherein the hierarchical data comprises at least one of JSON data or XML data, and wherein the relational data comprises at least one of SQL or DB2 data.

9. The method of claim 1, further comprising:
   determining, by the one or more processors, a type of one or more data objects in the hierarchical data; and
   processing, by the one or more processors, the one or more data objects, according to the determined type.

10. A system comprising:
   one or more processors; and
   a non-transitory computer readable medium storing instructions when executed by the one or more processors cause the one or more processors to:
      receive, via a network, a first file of a first format comprising hierarchical data including a set of data objects having hierarchical relationship, each of set of data objects including at least one of a plurality of keys in accordance with the hierarchical relationship,
      obtain a data object of the set of data objects in the hierarchical data, the data object including a key of the plurality of keys and a value,
      determine, from a set of candidate anchor paths, an anchor path for the data object based on the hierarchical relationship of the key within the plurality of keys, each candidate anchor path of the set of candidate anchor paths associated with a respective table of a plurality of tables, determine, from a set of candidate object paths, an object path for the data object based on the key and the anchor path, each candidate object path of the set of candidate object paths associated with a respective column one or more columns in a table of the plurality of tables associated with the anchor path, store, on a cache memory, the value of the data object and an indication of a corresponding column associated with the object path, determine that a minimum number of values for the one or more columns for a row that are stored in the cache memory, generate, responsive to determining that the minimum number of values are stored in the cache memory, the row of the table associated with the anchor path, wherein the row includes the value of the data object at the corresponding column associated with the object path, clear at least a portion of the cache memory in response to generating the row of the table, including the value of the data object at the corresponding column;

store, using a second file of a second format comprising relational data on a database, wherein the row includes the value of the data object at the corresponding column in the table of the plurality of tables; and maintain the plurality of tables on the database using the second file of the second format to be searchable for querying via the network.

11. The system of claim 10, wherein the non-transitory computer readable medium further stores instructions when executed by the one or more processors cause the one or more processors to:

add an entry including the key of the data object to a stack, concatenate keys in entries of the stack including the entry to obtain first concatenated keys, and determine the object path from the set of candidate object paths matching the first concatenated keys.

12. The system of claim 11, wherein the non-transitory computer readable medium further stores instructions when executed by the one or more processors cause the one or more processors to:

concatenate existing keys in entries of the stack other than the entry to obtain second concatenated keys, and determine the anchor path from the set of candidate anchor paths matching the second concatenated keys.

13. The system of claim 11, wherein the non-transitory computer readable medium further stores instructions when executed by the one or more processors cause the one or more processors to:

store, on the cache memory, the value of the data object and the indication of the column, in response to determining the object path from the set of candidate object paths matching the first concatenated keys, and remove the entry including the key of the data object from the stack, in response to storing the value of the data object and the indication of the column by the cache memory.

14. The system of claim 10, wherein the non-transitory computer readable medium further stores instructions when executed by the one or more processors cause the one or more processors to:

obtain another data object in the hierarchical data, determine, from the set of candidate object paths, another object path for the other data object, and generate the row of the table including another value of the other data object at another column associated with the other object path.

15. The system of claim 10, wherein the non-transitory computer readable medium further stores instructions when executed by the one or more processors cause the one or more processors to:

receive a user input specifying the set of candidate anchor paths and the set of candidate object paths, and generate configuration data indicating the set of candidate anchor paths and the set of candidate object paths, according to the user input.

16. The system of claim 10, wherein the non-transitory computer readable medium further stores instructions when executed by the one or more processors cause the one or more processors to:

analyze sample data, determine the set of candidate anchor paths and the set of candidate object paths, based on the sample data, and generate configuration data indicating the determined set of candidate anchor paths and the determined set of candidate object paths.

17. The system of claim 10, wherein the non-transitory computer readable medium further stores instructions when executed by the one or more processors cause the one or more processors to:

determine a type of one or more data objects in the hierarchical data; and process the one or more data objects, according to the determined type.

18. A non-transitory computer readable medium storing instructions when executed by one or more processors cause the one or more processors to:

receive via a network, a first file of a first format comprising hierarchical data including a set of data objects having hierarchical relationship, each of set of data objects including at least one of a plurality of keys in accordance with the hierarchical relationship;

obtain a data object of the set of data objects in the hierarchical data, the data object including a key of the plurality of keys and a value;

determine, from a set of candidate anchor paths, an anchor path for the data object based on the hierarchical relationship of the key within the plurality of keys, each candidate anchor path of the set of candidate anchor paths associated with a respective table of a plurality of tables;

determine, from a set of candidate object paths, an object path for the data object based on the key and the anchor path, each candidate object path of the set of candidate object paths associated with a respective column of a table of the plurality of tables associated with the anchor path;

store, on a cache memory, the value of the data object and an indication of a corresponding column associated with the object path;

determine that a minimum number of values for the one or more columns for a row that are stored in the cache memory;

generate, responsive to determining that the minimum number are stored in the cache memory, the row of the table associated with the anchor path, wherein the row includes the value of the data object at the corresponding column associated with the object path;

clear at least a portion of the cache memory in response to generating the row of the table, including the value of the data object at the corresponding column;

store, using a second file of a second format comprising relational data on a database, wherein the row includes the value of the data object at the corresponding column in the table of the plurality of tables; and maintain the plurality of tables on the database using the second file of the second format to be searchable for querying via the network.

* * * * *